(12) United States Patent
Yamamoto et al.

(10) Patent No.: US 7,298,366 B2
(45) Date of Patent: Nov. 20, 2007

(54) TOUCH PANEL AND ELECTRONIC EQUIPMENT USING THE SAME

(75) Inventors: Yuichi Yamamoto, Hirakata (JP);
Hirofumi Komiya, Hirakata (JP);
Nobuhiro Yamaue, Takaishi (JP);
Toshiharu Fukui, Nara (JP);
Yoshiharu Abe, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 69 days.

(21) Appl. No.: 10/204,705

(22) PCT Filed: Dec. 26, 2001

(86) PCT No.: PCT/JP01/11496

§ 371 (c)(1),
(2), (4) Date: Oct. 1, 2002

(87) PCT Pub. No.: WO02/054218

PCT Pub. Date: Jul. 11, 2002

(65) Prior Publication Data

US 2003/0122792 A1    Jul. 3, 2003

(30) Foreign Application Priority Data

Dec. 28, 2000    (JP) .............................. 2000-400455

(51) Int. Cl.
*G09G 5/00* (2006.01)

(52) U.S. Cl. .................. 345/174; 345/173; 349/12; 178/18.05

(58) Field of Classification Search ........ 345/173–183; 178/18.01–18.11, 19.01–19.07; 463/37–38
See application file for complete search history.

(56) References Cited

U.S. PATENT DOCUMENTS

| 4,527,862 A | * | 7/1985 | Arakawa ..................... 349/12 |
| 5,274,198 A | * | 12/1993 | Landmeier ............... 178/18.08 |
| 5,613,137 A | * | 3/1997 | Bertram et al. ................ 710/1 |
| 5,668,576 A | * | 9/1997 | Ikura et al. ................. 345/173 |
| 5,736,688 A | * | 4/1998 | Barrett et al. ............ 178/18.05 |
| 5,748,228 A | * | 5/1998 | Kobayashi et al. ........... 348/63 |
| 5,864,335 A | * | 1/1999 | Kuzunuki et al. ......... 345/173 |
| 6,559,902 B1 | * | 5/2003 | Kusuda et al. ................ 349/12 |
| 6,654,071 B2 | * | 11/2003 | Chen ........................... 349/12 |
| 2002/0190961 A1 | * | 12/2002 | Chen .......................... 345/173 |

FOREIGN PATENT DOCUMENTS

| JP | 1-102625 | | 4/1989 |
| JP | 04309163 | * | 10/1992 |
| JP | 5-197493 | | 8/1993 |
| JP | 05-197493 | * | 8/1993 |
| JP | 8-328741 | | 12/1996 |
| JP | 9-305296 | | 11/1997 |
| JP | 10257148 | * | 9/1998 |
| JP | 11-161428 | * | 6/1999 |
| JP | 11-184631 | | 7/1999 |
| JP | 2000-207983 | * | 7/2000 |
| JP | 2001-154592 | * | 6/2001 |

* cited by examiner

*Primary Examiner*—Lun-Yi Lao
(74) *Attorney, Agent, or Firm*—Steptoe & Johnson LLP (57) ABSTRACT

A touch panel and an electronic device using the touch panel have satisfactory, reliable operability. The touch panel is used for an operating section of the electronic device. In this touch panel, upper and lower substrates 21 and 22 have upper and lower electrode layers, respectively, and face with an established spacing. Respective center portions of the substrates 21 and 22 protrude upward like a dome.

6 Claims, 8 Drawing Sheets

PRIOR ART

FIG. 6

PRIOR ART

TOUCH PANEL AND ELECTRONIC EQUIPMENT USING THE SAME

TECHNICAL FIELD

The present invention relates to a touch panel used for an operating section of an electronic device, and to the electronic device using the panel.

BACKGROUND ART

Electronic devices each equipped with a light-transmitting touch panel mounted in front of a display element, such as an LCD, have recently grown in number as the devices have covered a broad spectrum and have become multifunctional. Each of the devices is operated by visually identifying and selecting characters, marks, or patterns displayed on the display element through the touch panel, and operating the touch panel.

A conventional touch panel is described with reference to FIGS. 6 to 8.

Figure 6:
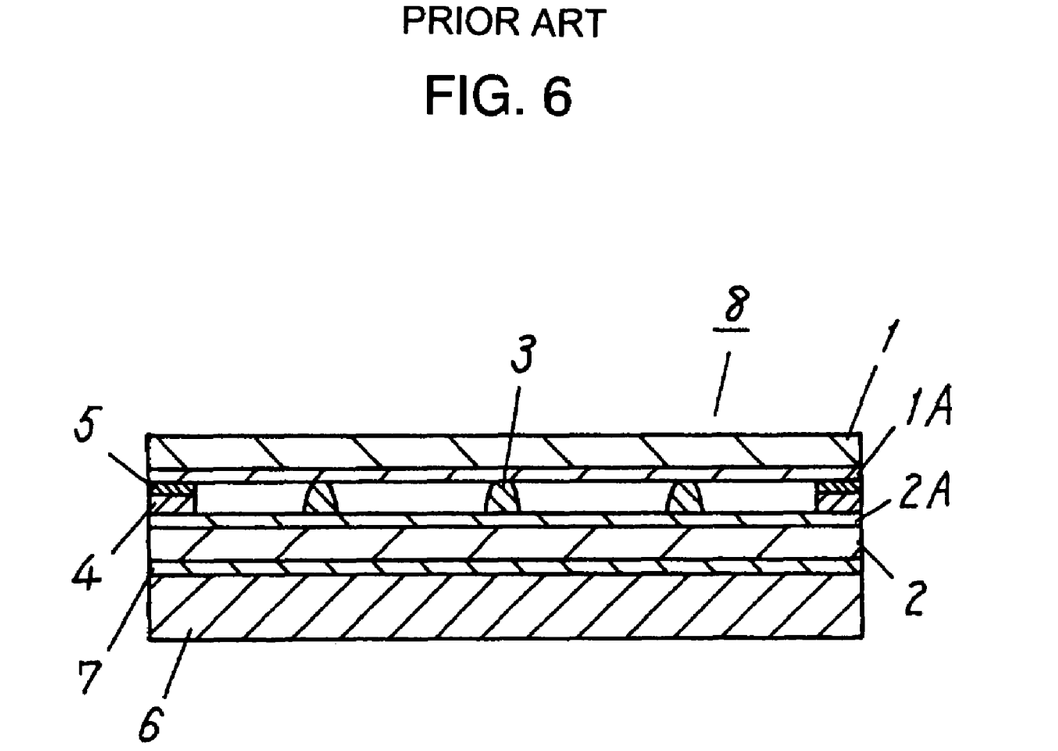
FIG. 6 is a section of a conventional touch panel.

FIG. 6 is a section of the conventional touch panel. Touch panel 8 includes transparent upper substrate 1, such as a film of polyethylene terephthalate, lower substrate 2 made of glass, transparent resin or the like, light-transmitting upper electrode layer 1A formed on a bottom of upper substrate 1, and light-transmitting lower electrode layer 2A formed on a top of lower substrate 2. Electrode layers 1A, 2A may be made of indium tin oxide (ITO). On the top of lower electrode layer 2A, plural dot spacers 3 made of epoxy, silicon, or the like is formed by printing, provides upper and lower electrode layers 1A and 2A with an established spacing between the layers to face each other. Over the top of lower substrate 2, insulating layer 4 and adhesive layer 5 are formed along an outer border of substrate 2, and upper and lower substrates 1 and 2 are put together by adhesive layer 5. Lower substrate 2 is bonded with adhesive layer 7 to a top of transparent supporter 6 made of resin or the like.

Figure 7:
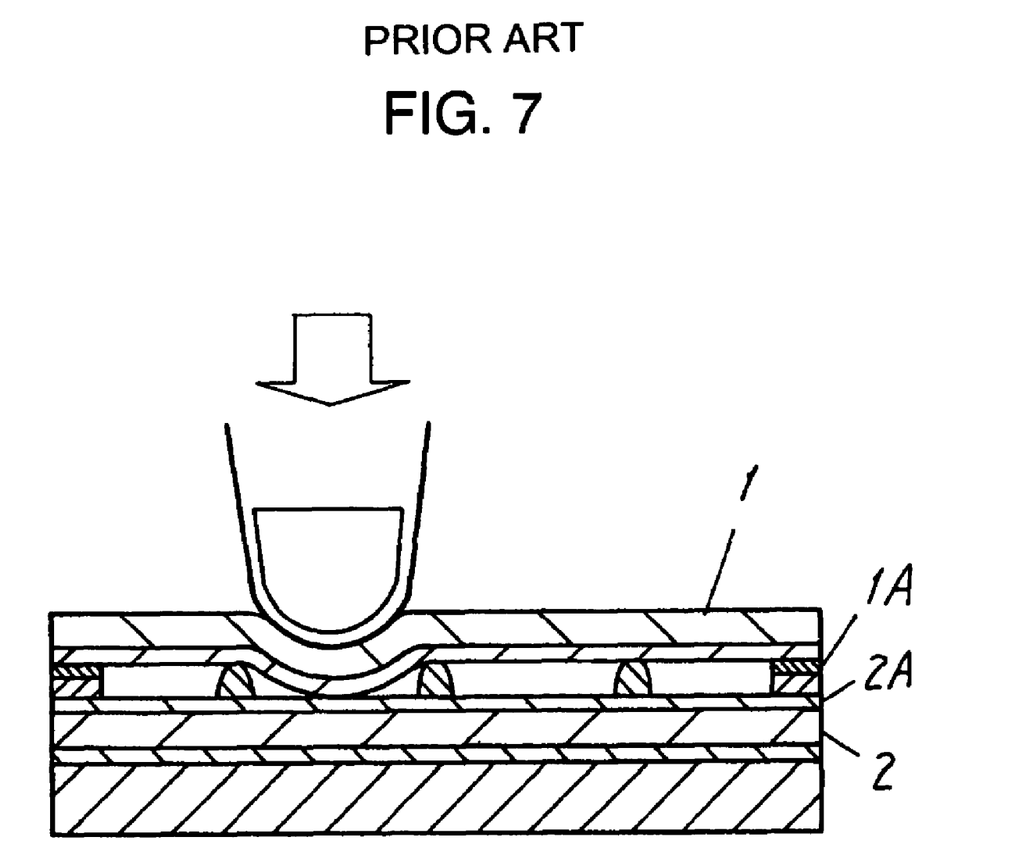
FIG. 7 is a section of the conventional touch panel in operation.

When a top of upper substrate 1 is pressed with a finger or pen, as shown in FIG. 7, upper substrate 1 bends, upper electrode layer 1A contacts with lower electrode layer 2A of lower substrate 2. Consequently, upper electrode layer 1A is electrically connected to lower electrode layer 2A. When a pressing force is released, elastic restoring force of upper substrate 1 makes panel 8 return to that illustrated by FIG. 6.

Figure 8:
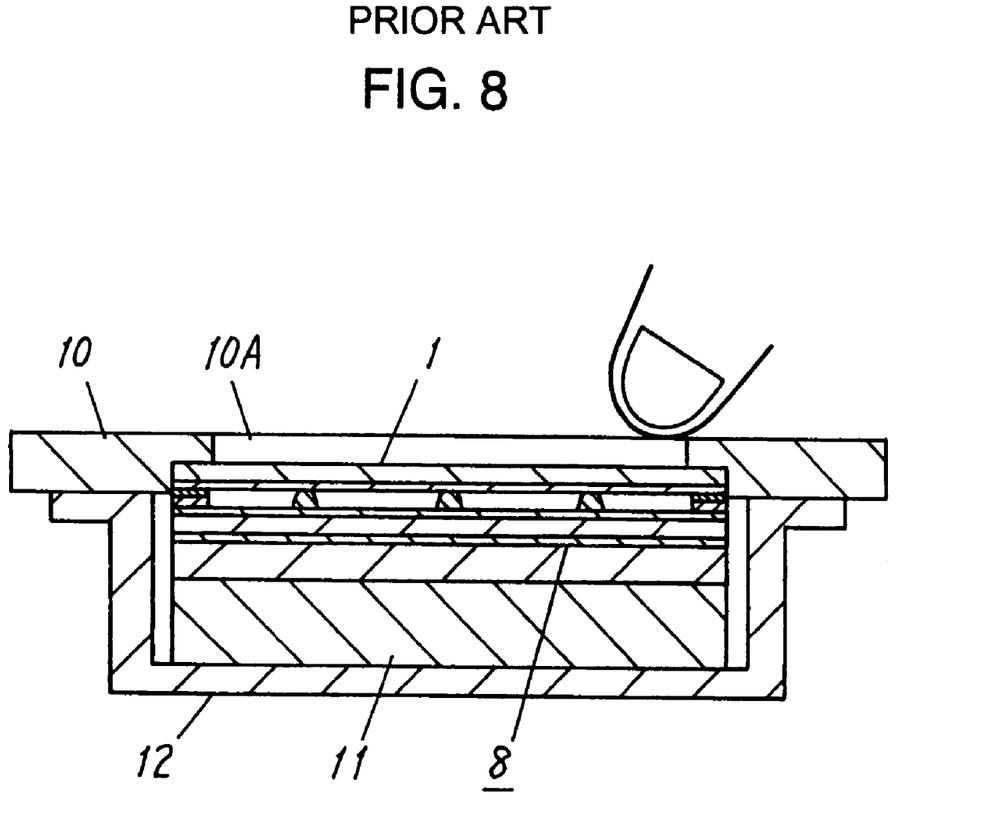
FIG. 8 is a section of an electronic device equipped with the conventional touch panel.

As shown in FIG. 8, touch panel 8 is installed at a bottom of opening 10A in case 10 of the electronic device, and is mounted to case 10 with holder 12 together with display element 11 (e.g., LCD) disposed below panel 8.

Trough transparent touch panel 8, the characters, the marks, or the patterns displayed on display element 11 are visually identified and selected through pressing upper substrate 1 over element 11. The pressing makes touch panel 8 electrically connected and disconnected. In this way, for example, the electronic device switches among functions, or display element 11 switches among displays.

Since being flat, conventional touch panel 8 mounted to case 10 of the electronic device has a top surface (operating surface) of upper substrate 1 positioned back to a surface of case 10. Therefore, as shown in FIG. 8, the finger or pen touches the surface of case 10 about an outer region of opening 10A when an outer border of upper substrate 1 is pressed for operation. Particularly for this case, a user hardly operate the panel and thus results in improper operation.

DISCLOSURE OF THE INVENTION

A touch panel and an electronic device using the panel have reliable operability.

The touch panel includes a light-transmitting upper substrate, a light-transmitting lower substrate spaced from and opposed to the upper substrate, a light-transmitting upper electrode layer on a surface of the upper substrate that faces the lower substrate, and a light-transmitting lower electrode layer provided on a surface of the lower substrate that faces the upper substrate. Respective center portion of the upper and lower substrates protrudes in a direction from the lower substrate to the upper substrate like a dome.

DESCRIPTION OF THE PREFERRED EMBODIMENT

An exemplary embodiment of the present invention is demonstrated hereinafter with reference to FIGS. 1-5. Elements similar to those in the prior art are denoted by the same reference numerals, and the detailed descriptions of those elements are omitted.

Figure 1:
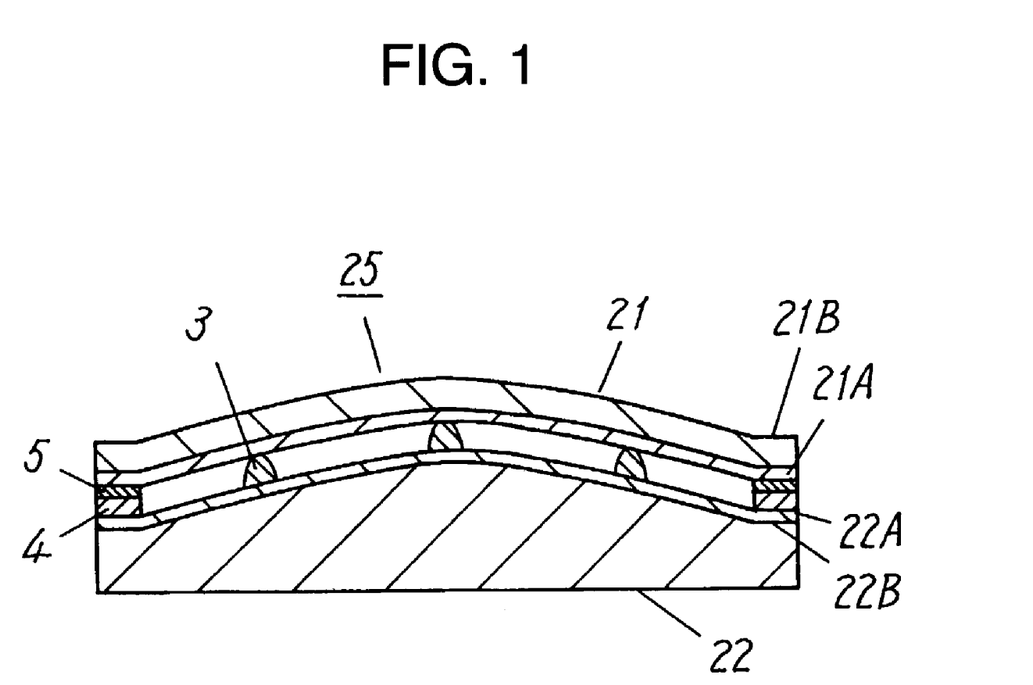
FIG. 1 is a section of a touch panel in accordance with an exemplary embodiment of the present invention.

FIG. 1 is a section of a touch panel in accordance with the embodiment of the present invention. Touch panel 25 includes transparent upper substrate 21, such as a film of polyethylene terephthalate or the like, massive, transparent lower substrate 22 that has a flat bottom and is made of polycarbonate, acrylic resin, norbornene resin or the like, light-transmitting upper electrode layer 21A formed on a bottom of upper substrate 21, and light-transmitting lower electrode layer 22A formed on a top of lower substrate 22. Electrode layers 21A and 22A may be made of indium tin oxide (ITO). Respective center portions of upper and lower substrates 21 and 22 protrude upward in a shape of a substantially hemispheric dome. On a top of lower electrode layer 22A, plural dot spacers 3 made of epoxy, silicon or the like is formed by printing, and provides upper and lower electrode layers 21A and 22A with an established spacing between the layers to face each other. Flat portions 21B and 22B are provided at respective outer borders of upper and lower substrates 21 and 22. Insulating layer 4, and adhesive layer 5 are formed along and over an outer border of flat part 22B. Flat portion 21B is coupled to adhesive layer 5, and thus upper and lower substrates 21 and 22 are put together.

When a top surface of upper substrate 21 is pressed by a finger or pen, upper substrate 21 bends, and upper electrode layer 21A contacts with lower electrode layer 22A of lower substrate 22. Consequently, upper electrode layer 21A is electrically connected to lower electrode layer 22A. Similarly to the prior art, elastic restoring force of upper substrate 21 returns to its original form when pressing force is released.

Figure 2:
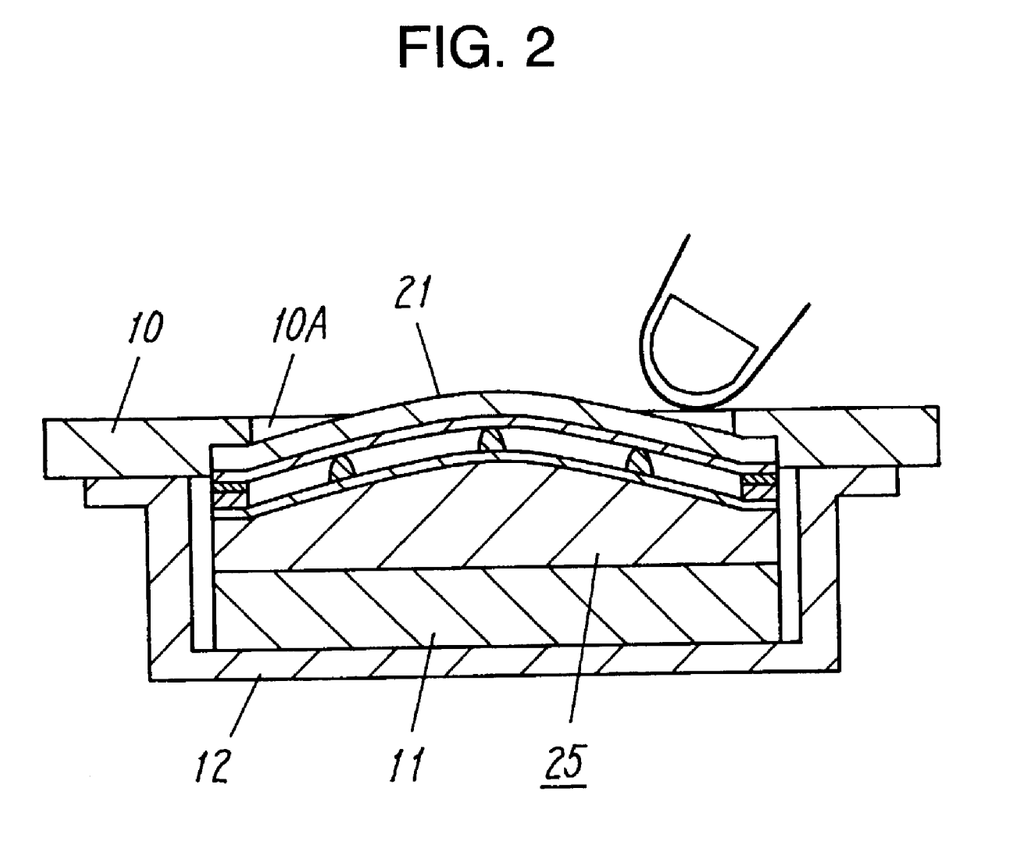
FIG. 2 is a section of an electronic device in accordance with the embodiment.

As shown in FIG. 2, touch panel 25 is installed at a bottom side of opening 10A in case 10 of an electronic device to be mounted to case 10 with holder 12 together with display element 11 (e.g., LCD) disposed below panel 25. The center portion of panel 25 is shaped domelike, and thus upper substrate 21 functioning as an operating side protrudes upward through opening 10A. This allows not only the center portion but also the outer border of panel 25 to be pressed easily, and this prevents the electronic device to be operated incorrectly.

Trough transparent touch panel 25, characters, marks, patterns or the like displayed on display element 11 are visually identified and selected though pressing upper substrate 21 over the panel 25. The pressing makes touch panel 25 electrically connected and disconnected. In this way, for example, the electronic device switches among functions, or display element 11 switches among displays. Since lower substrate 22 is massive, panel 25 can be mounted directly to case 10 without a supporter.

In touch panel 25 of the embodiment, respective center portions of upper and lower substrates 21 and 22 facing with the established spacing protrude upward in a dome shape. Touch panel 25, upon being mounted to a bottom of case 10 of the electronic device, has its center portion protrude upward through opening 10A of case 10. This prevents the panel from improper operation, and satisfactory operability is obtained.

Since being massive, lower substrate 22 does not require the supporter for holding substrate 22. Massive substrate 22 having its center portion protruding in the dome shape functions as a lens, and thus enlarges a screen of display element 11 disposed below the touch panel, and is thus easy to see.

Flat portions 21B and 22B provided at respective outer borders of upper and lower substrates 21 and 22 makes the upper and lower substrates put together easily, and thus the touch panel can be easily held and fixed to case 10 of the electronic device and display element 11.

Figure 3:
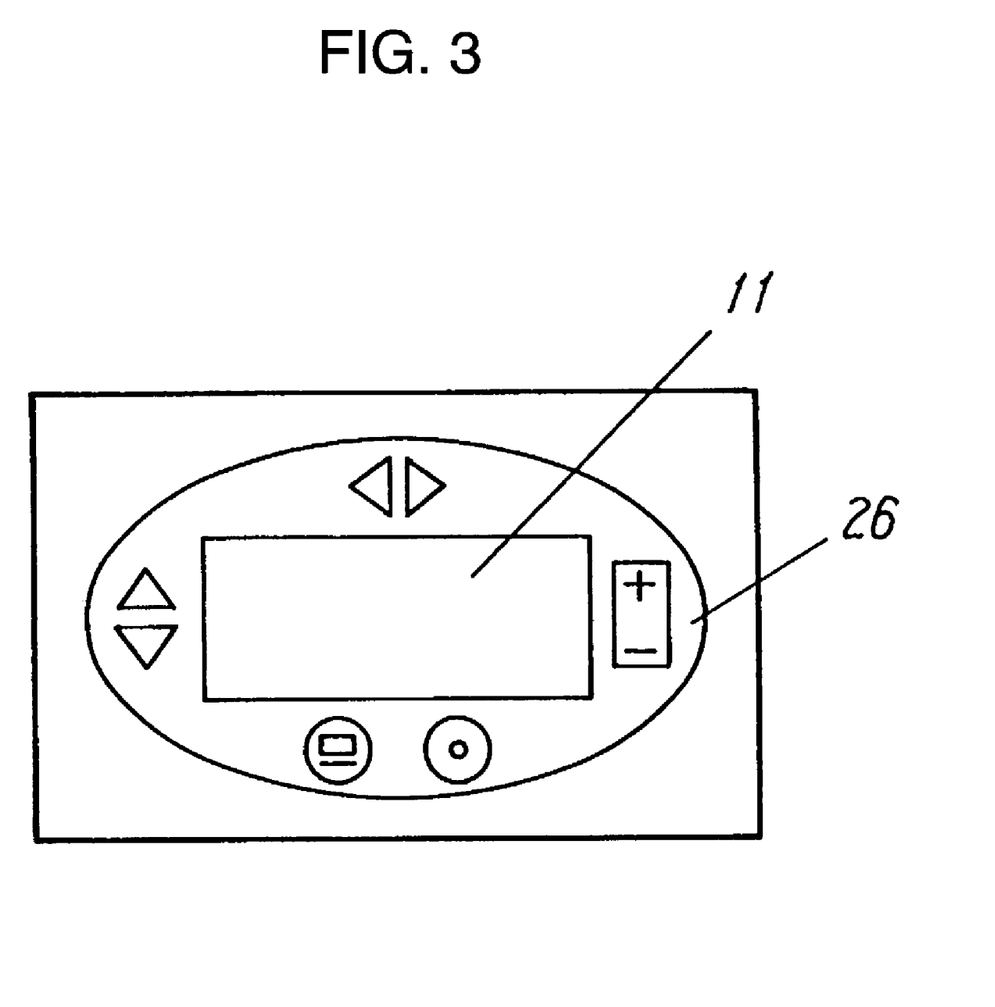
FIG. 3 is a plan view of the electronic device in accordance with the embodiment.

As shown in FIG. 3, display sheet 26 having display marks, such as marks or patterns of various functions, may be affixed to the outer border of the top surface of upper substrate 21 or the outer border of the bottom surface of lower substrate 22 which does not cover the screen of display element 11 disposed below. Sheet 26 allows switching among functions other than the functions displayed on display element 11, thus widening its functions. The display marks may be printed on the substrate instead of the sheet.

Figure 4A:
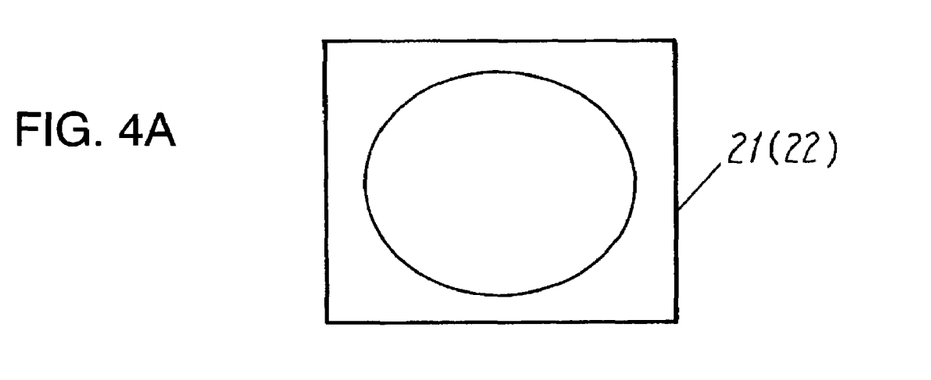
FIGS. 4A to 4C are plan views of upper substrates in accordance with the embodiment.
Figure 4B:
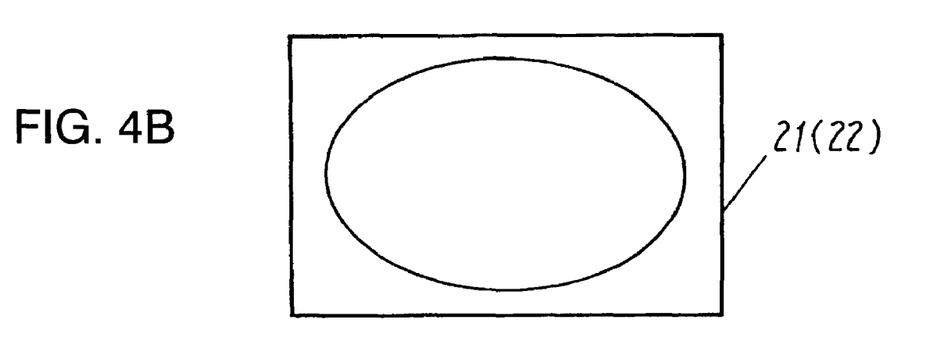
Figure 4C:
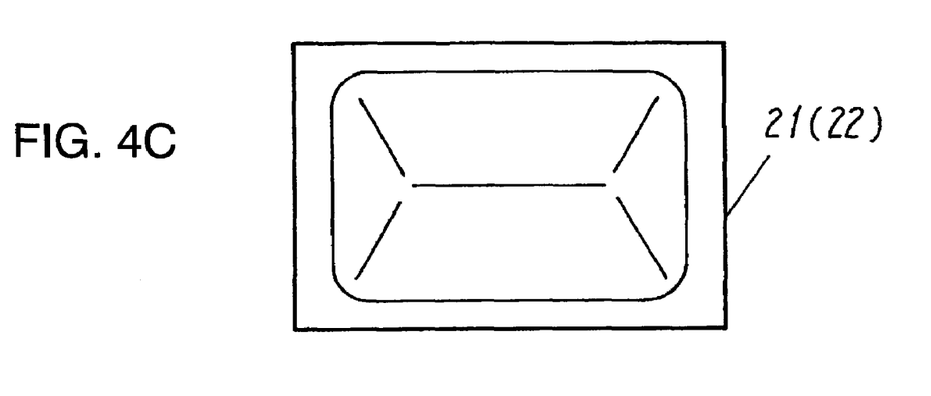

In the above description, respective dome-like portions of upper and lower substrates 21 and 22 are substantially hemispheric, as illustrated by FIG. 4A. However, the present invention is not limited to this, and the same advantages can be obtained even if the dome-like portion is substantially elliptical as illustrated by FIG. 4B or substantially quadrangular as illustrated by FIG. 4C according to the shape of opening 10A of the device.

Figure 5:
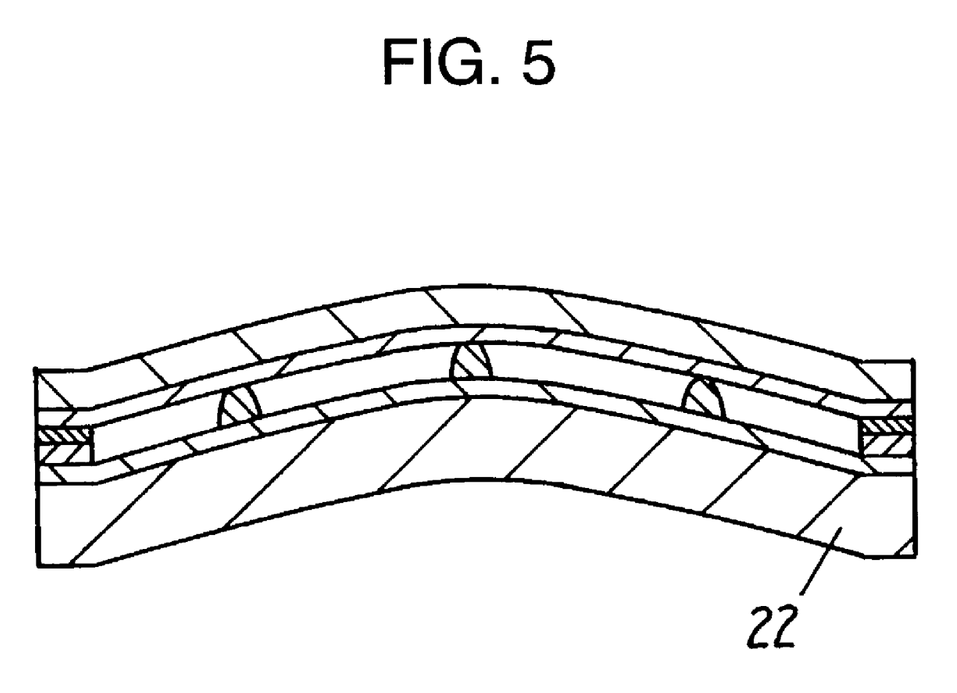
FIG. 5 is a section of another touch panel in accordance with the embodiment.

Lower substrate 22, upon being sheet-like or having different thicknesses between the center portion and the outer border, exhibits various lens effects.

In the above description, the center portion of the operating side of touch panel 25 protrudes upward relative to a top of case 10. However, the present invention is not limited to this, and the operating side may be positioned slightly back to the top of case 10 with a low dome-like shape when panel 25 is used in a portable device.

INDUSTRIAL APPLICABILITY

The present invention provides a touch panel and an electronic device using the panel. The touch panel has satisfactory operability and is less likely to cause improper operation.

The invention claimed is:

1. A touch panel for mounting on a planar display, the touch panel comprising:
   a first light-transmitting substrate having a first surface and a second surface opposite to the first surface of the first light-transmitting substrate;
   a second light-transmitting substrate having a first surface and a second surface, the first surface of the second light-transmitting substrate facing the first surface of said first light-transmitting substrate with a space therebetween, the second surface of the second light-transmitting substrate being a plane arranged to be mounted onto a planar surface of a display element;
   a first light-transmitting electrode layer on the first surface of said first light-transmitting substrate; and
   a second light-transmitting electrode layer on the first surface of said second light-transmitting substrate,
   wherein respective center portions of the first surface of said first substrate, the second surface of said first substrate, and the first surface of said second subtrate protrude in a direction from the second substrate to the first substrate,
   wherein said second light-transmitting substrate comprises a lens, and
   wherein the center portion of said second substrate is thicker than a periphery of said second substrate.

2. The touch panel of claim 1, wherein the second surface of said first substrate comprises a flat portion of the periphery thereof.

3. The touch panel of claim 1, further comprising:
   a display sheet affixed to one of the second surface of said first substrate and the second surface of said second substrate.

4. The touch panel of claim 1, further comprising:
   a display mark on one of the second surface of said first substrate and the second surface of said second substrate.

5. A device comprising:
   a display element having a planar surface;
   a touch panel comprising:
   a first light-transmitting substrate having a first surface and a second surface opposite to the first surface of the first light-transmitting substrate;
   a second light-transmitting substrate having a first surface and a second surface of the second light-transmitting substrate, the first surface of the second light-transmitting substrate facing the first surface of said first substrate with a space therebetween, the second surface of the second light-transmitting substrate being a plane arranged to be mounted onto the planar surface of the display element;
   a first light-transmitting electrode layer on the first surface of said second substrate wherein
   respective center portion portions of the first surface of said first substrate, the second surface of said first substrate, and the first surface of said second substrate protrude in a direction from the second substrate to the first substrate,
   said second light-transmitting substrate comprises a lens, and
   the center portion of said second substrate is thicker than a periphery of said second substrate; and
   a case having an opening to which said first substrate of said touch panel is engaged.

6. The device of claim 5, wherein said case includes a portion surrounding the opening, the portion of said case being flat and parallel to the plane of said display element, wherein the second surface of said first substrate comprises a flat portion at a periphery thereof, and wherein the flat portion of the second surface of said first substrate contacts the portion of said case.

* * * * *